UNITED STATES PATENT OFFICE.

G. W. COREY, OF PORT JERVIS, NEW YORK.

IMPROVEMENT IN THE MANUFACTURE OF BLACKING.

Specification forming part of Letters Patent No. 52,391, dated February 6, 1866.

*To all whom it may concern:*

Be it known that I, G. W. COREY, of Port Jervis, in the county of Orange and State of New York, have invented a certain new and useful Improvement in Compositions for Blacking; and I do hereby declare the following to be a full, clear, and exact description of the manner of compounding and using the same.

My composition for blacking is of the kind usually denominated "water-proof," and is intended for use upon any article made of leather where such composition may be serviceable, but more particularly for boots and shoes; and while it will render the leather impervious to water it is susceptible of a good polish.

In making my composition I use the following-named articles or ingredients in the proportions here recited, each ingredient being estimated by weight: Twenty-eight (28) ounces of pure india-rubber and eight (8) ounces of gutta-percha, or thirty-six (36) ounces of old rubber, one hundred and sixty (160) ounces of unrendered beef-tallow, eighty-eight (88) ounces of neat's-foot oil, eight (8) ounces of beeswax, six (6) ounces of lamp-black, six (6) ounces of resin, two (2) ounces of spermaceti.

The rubber and gutta-percha must be boiled in the tallow until they are dissolved, when all the other ingredients can be added, and the mass, when melted, stirred till nearly cold and then boxed for use.

This composition-blacking will keep in any climate. It can be applied cold and the first coating well warmed in. Any subsequent coating can also be applied cold, warming not being necessary; and when used while there is snow on the ground the friction against the snow will produce the polish. Under its use the leather will be kept pliable and bright.

What I claim as my invention, and desire to secure by Letters Patent, is—

The composition for water-proof blacking made up of the ingredients, in the manner, and of the quantities as herein recited.

This specification signed this 23d day of December, 1865.

G. W. COREY.

Witnesses:
L. F. HOUGH,
ALEX. T. BROWN.